United States Patent [19]

Kokeguchi et al.

[11] Patent Number: 5,439,250
[45] Date of Patent: Aug. 8, 1995

[54] INFLATOR FOR AIR BAG DEVICE

[75] Inventors: Akira Kokeguchi; Yoshikazu Nakayama, both of Shiga, Japan

[73] Assignee: Takata Corporation, Tokyo, Japan

[21] Appl. No.: 249,570

[22] Filed: May 26, 1994

[30] Foreign Application Priority Data

Jun. 8, 1993 [JP] Japan .................. 5-137435

[51] Int. Cl.6 .................................. B60R 21/26
[52] U.S. Cl. ..................... 280/736; 280/741
[58] Field of Search ............ 280/736, 741, 742; 102/530, 531

[56] References Cited

U.S. PATENT DOCUMENTS

| | | | |
|---|---|---|---|
| 4,561,675 | 12/1985 | Adams et al. | 280/741 |
| 4,817,828 | 4/1989 | Goetz | 222/3 |
| 4,846,368 | 7/1989 | Goetz | 280/736 |
| 4,858,951 | 8/1989 | Lenzen | 280/741 |
| 4,890,860 | 1/1990 | Schneiter | 280/741 |
| 4,944,528 | 7/1990 | Nilsson et al. | 280/741 |
| 5,109,772 | 5/1992 | Cunningham et al. | 280/741 |
| 5,116,080 | 5/1992 | Wipasuramonton | 280/741 |
| 5,269,561 | 12/1993 | Davis et al. | 280/736 |
| 5,299,828 | 4/1994 | Nakajima et al. | 280/741 |

FOREIGN PATENT DOCUMENTS 2251221A 1/1992 United Kingdom .
2257951A 1/1993 United Kingdom .

*Primary Examiner*—Brian L. Johnson
*Assistant Examiner*—Paul N. Dickson
*Attorney, Agent, or Firm*—Kanesaka & Takeuchi

[57] ABSTRACT

An inflator is formed of a cylindrical casing filled with propellant, booster filled in a tube, and auto ignition material situated inside the tube. An electrical ingitor is disposed in the casing. First gas outlet holes are disposed on the front surface of the casing and second gas outlet holes are disposed on the rear surface of the casing. The first gas outlet holes are covered by a first film member and the second gas outlet holes are covered by a second film member. As the booster is ignited by the electrical ignitor, a gas pressure of 20~25 MPa is applied to break only the first film member. In fire, a gas pressure of 30~35 MPa is applied to break both of the first and second film members.

8 Claims, 2 Drawing Sheets

INFLATOR FOR AIR BAG DEVICE

BACKGROUND OF THE INVENTION

1. Field of the Invention

The present invention relates to an inflator for use in an air bag device, more particularly, to an inflator of a cylindrical type.

2. Description of Prior Art

An inflator for use in an air bag device for a passenger seat comprises a cylindrical casing having holes for discharging gas disposed on the peripheral surface thereof, propellant filled in the casing, booster for causing gas evolution of the propellant, an electrical ignitor for igniting the booster, and an auto ignition material having a lower firing temperature than the firing temperature of the booster. The casing is generally made of an aluminum or aluminum base alloy. The holes for discharging gas are generally sealed by a film. As gas is generated by the propellant, the film is broken by the gas pressure. The cylindrical inflator of this type is sometimes used for an air bag device for a driver seat.

As disclosed in Japanese Laid Open Patent Publication No. 1990-63951 corresponding to U.S. patent application Ser. No. 190,479 (dated May 4, 1988) now U.S. Pat. No. 4,858,951, and Japanese Laid Open Patent Publication No. 1990-74441 corresponding to German Patent Application No. DE 3824469.1 (dated Jul. 19, 1988), equivalent to U.S. Pat. No. 4,944,528, in case that the inflator of the air bag device is involved in the fire, the casing bursts due to the gas evolution of the propellant if the rigidity of the casing is decreased prior to the initiation of the gas evolution,of the propellant. In the inflator of this type, an auto ignition material is disposed to initiate the gas evolution of the propellant before the rigidity of the casing is extremely decreased in case that the inflator is involved in the fire and its ambient temperature is risen. In the event of fire, the auto ignition material ignites first to generate heat and then the booster ignites by the heat. As a result of this, the propellant initiates the gas evolution.

In the event of a collision of a vehicle, an electrical ignitor provided besides the auto ignition material ignites the booster.

In the conventional inflator for the air bag device, because holes for discharging gas are disposed only on one side of the peripheral surface of the casing, the gas is spouted in one direction so that the inflator receives a force in the fire during transportation or storage of the inflator.

SUMMARY OF THE INVENTION

It is therefore an object of the present invention to prevent an inflator from receiving a force even in the fire.

An inflator for an air bag device of the present invention includes a cylindrical casing, a propellant filled in the casing; a booster filled in a tube in the casing for causing a gas evolution of the propellant, an electrical ignitor for igniting the booster; an auto ignition material situated inside the tube for igniting the booster in case that the inflator is involved in the fire, a plurality of first gas outlet holes disposed on one side of a peripheral surface across a plane including a shaft axis of the casing, a plurality of second gas outlet holes disposed on the other side of the peripheral surface, a first sealing member for sealing each of the first gas outlet holes and for releasing the first gas outlet holes in case that the propellant is ignited, and a second sealing member for sealing each of the second gas outlet holes and for releasing the second gas outlet holes only when the propellant is ignited by the auto ignition material in case that the inflator is involved in the fire.

It is preferable that each of the first and second sealing members is a film adhered to an inner surface of the casing.

In the inflator according to the present invention, when the propellant is ignited by the electrical ignitor in the usual way, gas is spouted only through the first gas outlet holes. As the heat at the fire is applied to the inflator, the auto ignition material is fired to ignite the booster and the propellant then initiates the gas evolution. In this event, since the heat at the fire is applied to the inflator, the gas evolution of the propellant is active and the heat of the gas evolution is not substantially absorbed into the metal members of the casing, the filter and the surrounding members so that a high pressure is applied within the casing. Thereby, the first and second sealing members are opened. Therefore, the gas from the inflator is spouted into the both directions across the shaft axis of the inflator so that the motive force is not applied.

As described above, according to the inflator of the present invention, the gas is spouted in the both directions in case that the inflator is involved in the fire so that the motive force is not applied to the inflator. This prevents the inflator from flying.

DETAILED DESCRIPTION OF THE PREFERRED EMBODIMENT

Figure 1:
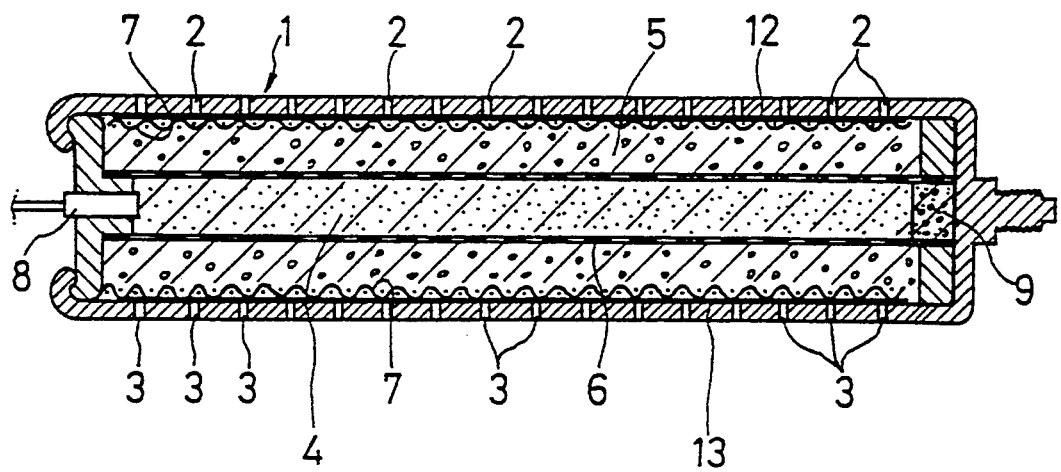
FIG. 1 is a cross-sectional view showing an inflator along the longitudinal direction that is along the line I—I shown in FIG. 3 according to an embodiment of the present invention.
Figure 2:
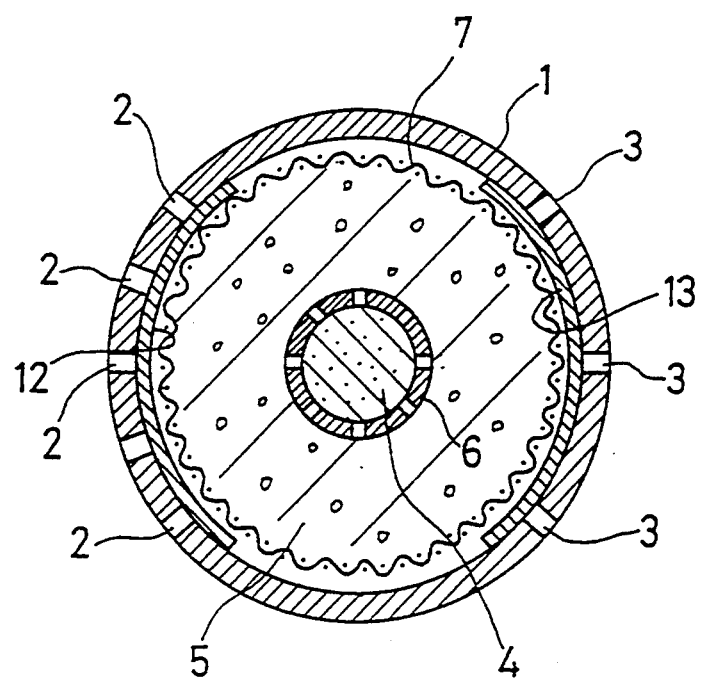
FIG. 2 is an enlarged cross-sectional view showing the inflator along the line II—II shown in FIG. 3.
Figure 3:
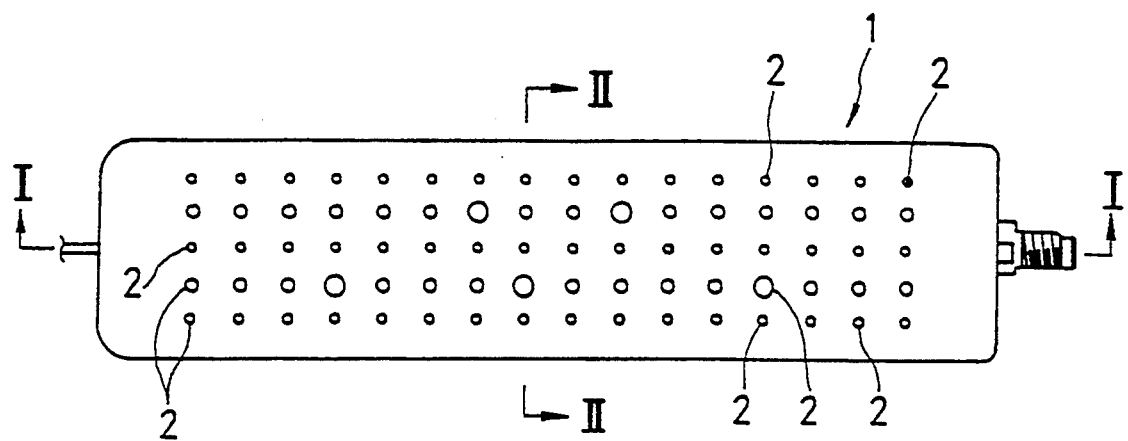
FIG. 3 is a plane view showing the inflator according to the embodiment.
Figure 4:
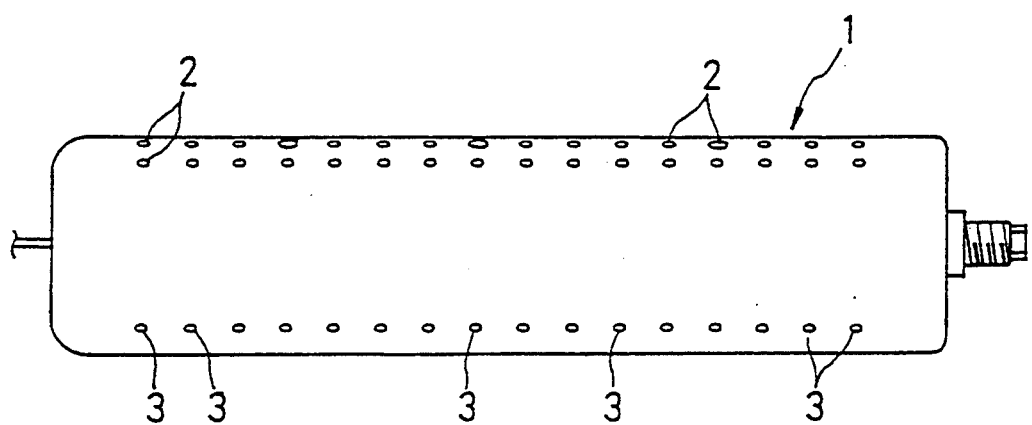
FIG. 4 is a side view showing the inflator according to the embodiment.

An embodiment of the present invention will now be described with reference to attached figures.

A casing 1 is cylindrical and has a plurality of gas outlet holes 2 for discharging gas disposed on one side of the peripheral surface thereof and a plurality of gas outlet holes 3 disposed on the other side. The casing 1 is made of an aluminum or aluminum base alloy. A booster 4 is disposed along the shaft axis in the casing 1. A propellant 5 is filled around the booster 4. The numeral 6 designates a tube having a plurality of holes on the peripheral surface thereof for separating the propellant 5 and the booster 4.

A filter 7 is disposed along the inner surface of the casing 1. The filter 7 has a function of filteration of gas spouted through the gas outlet holes 2, 3. An electrical ignitor 8 is disposed on an end face of the casing 1. The electrical ignitor 8 has a wire generating heat by electricity and explosive. When the wire receives an electric current, the explosive is fired and thereby the booster 4 is ignited so that the propellant 5 initiates the gas evolution. An auto ignition material 9 is situated inside the tube 6 and is disposed along the other end face in the casing 1. Films 12 and 13 are adhered to the inner surface of the casing to seal the gas outlet holes 2, 3. The film 12 is made to be broken by a low pressure in comparison with the film 13.

In the air bag device having the inflator structured as described above, as the vehicle with the air bag faces a collision, the electrical ignitor 8 is turned to receive an electric current and the booster 4 is then ignited as described above so that the propellant 5 initiates the gas evolution to rapidly generate a large amount of gas. The gas breaks only the film 12 to be spouted through the gas outlet holes so as to quickly extend the air bag.

In case that the inflator is involved in the fire during transportation or storage of the inflator, the auto ignition material 9 is fired first. Soon after this, the evolution of the booster 4 and propellant 5 are initiated. The generated gas breaks the films 12, 13 and is spouted in the both direction of the inflator through the gas outlet holes 2, 3.

In case that the booster 4 is ignited by the electrical ignitor 8, the highest pressure in the casing is approximately $20 \sim 25$ MPa. While, in case that the booster 4 is ignited by the auto ignition material 9 in the face of fire, the highest pressure in the casing is approximately $30 \sim 35$ MPa because the gas evolution of the propellant 5 is active and the heat generated from the propellant 5 is not absorbed into the surrounding by the fire. That is, only the film 12 is broken in case that the propellant 5 is ignited by the electrical ignitor 8, while the films 1.2 and 13 are broken in the event of fire.

Preferably, the film is a metal film of aluminum or the like, or made of a synthetic resin laminated to a metal film. The synthetic resin is preferably polyethylene terephthalate, nylon, polypropylene or the like. When the films 12 and 13 are made of the same material, the thickness of the film 12 is less than the thickness of the film 13 so that the film 12 is broken by a low pressure in comparison with the film 13.

In the present invention, the films 12 and 13 can be made of the same material and have the same thickness, when the diameter of the outlet hole 3 is smaller than the diameter of the outlet hole 2.

In the present invention, the booster may be a a mixture of $TiH_2$ (titanium hydride), $KClO_4$ (potassium perchlorate) and $BKNO_3$ (boron potassium nitrate). The auto ignition material is preferably smokeless powder which, for example, fires at approximately $150°$ C.$\sim 200°$ C. The propellant is preferably sodium azide.

What is claimed is:

1. An inflator for an air bag device comprising,
    a cylindrical casing having a cylindrical periphery, two side portions located at longitudinal ends of the casing, a plurality of first gas outlet holes disposed on one side of the cylindrical periphery, and a plurality of second gas outlet holes disposed on the other side of the cylindrical periphery,
    a propellant filled in the casing,
    a tube situated in a center of the propellant and extending in a longitudinal direction of the casing between the side portions,
    a booster filled in the tube for actuating the propellant,
    an electrical ignitor attached to one of the side portions of the casing, said ignitor being operated by a collision of an automobile and igniting the booster to actuate the propellant to thereby expand an air bag for the air bag device,
    an auto ignition material situated inside the tube opposite to the electrical ignitor and disposed adjacent the other side portion of the casing, said auto ignition material igniting at a temperature between $150°$ and $200 °$ C.,
    a first sealing film for sealing the first gas outlet holes, said first sealing film being opened in the case that the propellent is ignited by one of the electric ignitor and the auto ignition material, and
    a second sealing film for sealing the second gas outlet holes, said second sealing film being opened in the case that the propellent is ignited only by the auto ignition material so that when the inflator is involved in fire, the first and second sealing films are opened to thereby smoothly release a gas from the inflator.

2. An inflator as claimed in claim 1 wherein each of said first and second sealing films is adhered to an inner surface of said casing.

3. An inflator as claimed in claim 2, wherein each of said films is a metal film.

4. An inflator as claimed in claim 2, wherein each of said films is a formed of a metal film laminated with a synthetic resin film.

5. An inflator as claimed in claim 4, wherein said synthetic resin film is made of polyethylene terephthalate, nylon, or polypropylene.

6. An inflator as claimed in claim 2, wherein said first and second films are made of a same material and the thickness of said first film is smaller than the thickness of said second film.

7. An inflator as claimed in claim 2, wherein said first and second films are made of a same material and have a same thickness, and the diameter of each of said second gas outlet holes is smaller than the diameter of each of said gas outlet holes.

8. An inflator as claim in claim 1, wherein said propellant produce a pressure having approximately $20 \sim 25$ MPa in the case of being ignited by said electrical ignitor, said propellant produce a pressure having approximately $30 \sim 35$ MPa in the case of being ignited by the auto ignition material in the case of fire.

* * * * *